United States Patent [19]

Hoppe et al.

[11] 4,036,821

[45] July 19, 1977

[54] MANUFACTURE OF MODIFIED BASIC POLYAMINOAMIDE WITH AMMONIUM COMPOUND

[75] Inventors: Lutz Hoppe; Rudolf Behn, both of Walsrode, Germany

[73] Assignee: Wolff Walsrode Aktiengesellschaft, Walsrode, Germany

[21] Appl. No.: 517,785

[22] Filed: Oct. 24, 1974

[30] Foreign Application Priority Data

Oct. 25, 1973 Germany .............................. 2353430

[51] Int. Cl.² .............................................. C08G 69/48
[52] U.S. Cl. ........................ 260/78 SC; 260/29.2 EP; 260/29.2 N; 260/78 A; 260/78 L; 162/164 R
[58] Field of Search .............. 260/78 SC, 78 A, 78 L

[56] References Cited
U.S. PATENT DOCUMENTS

| 3,224,990 | 12/1965 | Babcock | 260/78 SC |
| 3,240,761 | 3/1966 | Keim et al. | 260/78 SC |
| 3,632,559 | 1/1972 | Matter et al. | 260/78 SC |
| 3,699,183 | 10/1972 | Hermann et al. | 260/78 SC |

*Primary Examiner*—Harold D. Anderson
*Attorney, Agent, or Firm*—Plumley and Tyner

[57] ABSTRACT

A process for the production of water-soluble auxiliary agents based on polyaminoamides by reacting a polyfunctional compound with a tertiary, monofunctional amine to form an ammonium compound and reacting that ammonium compound with a basic polyaminoamide, the basic polyaminoamide being the polycondensation product of a dicarboxylic acid, a polyalkylenepolyamine and an aminocarboxylic acid or lactam thereof, the basic polyaminoamide being reacted with 0.15 to 0.19 mol of a polyfunctional compound per mol equivalent of secondary amino group in the polyamide, incorporating that modified basic polyaminoamide in the paper pulp so as to increase the retention of fibres, fillers or pigments, or to accelerate the drawings.

4 Claims, No Drawings

MANUFACTURE OF MODIFIED BASIC POLYAMINOAMIDE WITH AMMONIUM COMPOUND

PRIOR ART

This invention relates to a process for the production of basic, storage-stable polyaminoamides which can be reacted with the polyfunctional compounds and which are suitable as retention agents for fillers and pigments, as drainage accelerators and as agents for treating effluents in the manufacture of paper.

Suitable processes of this kind are already known for the preparation of such products which can be used as auxiliaries in the manufacture of paper.

Thus U.S. Pat. No. 3,320,215 discloses that aminocarboxylic acids or lactams thereof can be polycondensed with dicarboxylic acids and polyalkylenepolyamines and can be crosslinked with epichlorohydrin.

A condensate composed of polyalkylenepolyaminodicarboxylic acids, which has been reacted with epichlorohydrin, is also disclosed in British Patent Specification No. 865,727.

British Patent Specification No. 1,035,296 also discloses reactions between epichlorohydrin and polyaminoamides which have been prepared from dicarboxylic acids and polyalkylenepolyamines. These products are at least relatively stable on storage.

Finally, German Auslegeschrift No. 1,771,814 has disclosed the use of basic polyamides for increasing the retention of fillers and pigments in the manufacture of paper, for accelerating the drainage of suspensions of raw materials for paper and for working up effluents from paper machines by filtration, sedimentation and flotation, by the addition of basic polyamides to the suspensions of raw materials for paper and/or effluents from paper machines, the basic polyamides used being high molecular, water-soluble reaction products, which have been obtained by the action of compounds which are polyfunctional towards amino groups, on basic polyamides composed of polyfunctional amines, dicarboxylic acids and aminocarboxylic acids containing at least three carbon atoms, or their lactams, dissolved or dispersed in water, and for the preparation of which less than one equivalent of reactive groups in the polyfunctional compounds has been used for one equivalent of the basic amino groups contained in the basic polyamides.

All the products disclosed by the abovementioned state of the art are, however, insufficiently stable on storate in a basic medium, and their function as a retention agent in the sense mentioned above is not satisfactory.

In using these crosslinked polyaminoamides in the paper industry for raising the retention of fillers, pigments and fibres and for accelerating the drainage of suspensions of raw materials for paper, it is necessary for these polyaminoamides to be compatible with the basic products based on polyethyleneimine, which possess a similar function and are often admixed, that is to say these polyaminoamides must possess an adequate stability on storage in this basic medium. If, as with the products disclosed by the abovementioned state of the art, this is not the case, these products are completely gelled in the presence of alkaline solutions of polyethyleneamine, as a result of which problems arise in the manufacture of paper, because the paper web is not sufficiently drained.

OBJECT OF THE INVENTION

It is therefore an object of the invention to provide a suitable process for the production of a retention agent which, in respect of process conditions, exhibits an improved retention and performance in accelerating drainage in the manufacture of paper and, furthermore, is stable in an alkaline medium.

THE INVENTION

Accordingly this invention relates to a process for the production of a modified basic polyaminoamide which comprises the steps of (a) reacting a polyfunctional compound with a tertiary, monofunctional amine to form an ammonium compound and (b) reacting 0.2–1.8 mols of the ammonium compound with each mol of secondary amino group in a water-soluble, basic polyaminoamide, the basic polyaminoamide being a condensation product of a member selected from the class consisting of dicarboxylic acids, a member selected from the class consistiong of polyalkylenepolyamines and a member selected from the class consisting of amino carboxylic acids and lactams, the basic polyaminoamide being reacted with 0.15–0.19 mol of a polyfunctional compound per mol equivalent of secondary amino groups in the polyaminoamide. In the said process a tertiary, monofunctional amine is a member, selected from a group which comprises trimethylamine, triethylamine, tripropylamine, tributylamine, dimethylaniline or dimethylcyclohexylamine or a mixture of any thereof. Moreover, in said process 1 mol of the polyfunctional compound and 1 mol of the tertiary, monofunctional amine are reacted.

The effect of a reaction product made from the polyfunctional compound, such as, for example, epichlorhydrin or dichlorhydrin, and from a tertiary, monofunctional amine, such as, for example, tirmethylamine, triethylamine, tripropylamine, tributylamine, triethanolamine, dimethylaniline and dimethylcyclohexylamine, is to obtain and maintain the positively charged character of the basic polyaminoamide, which products an improvement of the retention, acceleration of drainage, sedimentation and flotation of suspensions of raw materials for paper and/or of efffluents from paper machines. The product, obtained by the process according to the invention comprises modified basic polyaminoamides, which are a reaction product of a (a) polyfunctional compound, selected from the class consisting of epichlorhydrin and dichlorhydrin or a mixture thereof, (b) a tertiary, monofunctional amine, selected from a group which comprises trimethylamine, triethylamine, tripropylamine, tributylamine, dimethylaniline or dimethylcyclohexylamine or a mixture of thereof, (c) a basic polyaminoamide as a condensation product of (I) a member selected from a group, which comprises dicarboxylic acids, (II) a member selected from a group comprises polyalkylenepolyamines and (III) a member selected from a group, which comprises aminocarboxylic acids and lactams; and wherein said reaction product (a, b, c) has been reacted with 0.15–0.19 mol of a polyfunctional compound per mol equivalent of secondary amino group in the polyaminoamide.

The effect of a reaction product of this compound is to obtain and maintain the positively charged character of the basic polyaminoamide, which products an improvement of the retention, acceleration of drainage, sedimentation and flotation of suspensions of raw materials for paper and/or effluents from paper machines. In addition, as a further advantage, it should be noticed that the product obtained by the process according to the invention has a surprisingly good stability on storage, especially in a basic medium. At the close of the manufacturing process, therefore, it is no longer necessary, as it has been hitherto, to acidify the product obtained so that it does not gel prematurely or otherwise becomes unusable as a retention agent in the sense previously mentioned. The same advantages result, if, instead of one tertiary amine, several of the abovementioned amines are mixed and this mixture is reacted with polyfunctional compounds such as epichlorohydrin or dichlorohydrin, or these products are allowed to act upon one another. A particularly preferred manufacturing process is one in which a trialkylamine is used as the tertiary, monofunctional amine which is treated with one mol equivalent of the polyfunctional compound and then reacts with a basic polyaminoamide which reacts with 0.16–0.18 mol of epichlorohydrin per mol of secondary amino groups in the polyaminoamide.

Products of this kind can be stored particularly well even in an alkaline medium or can be mixed with polyethyleneimines or with other basic materials used in the manufacture of paper, without the occurrence of gelling or other disadvantageous changes. In addition, they exhibit a particularly high retention effect. Therefore a method lies within the scope of the invention, in which the retention of fibres, fillers or pigments or accelerating drainage or working up effluent in paper manufacture is increased, that method comprises incorporating a modified basic polyaminoamide into the paper pulp or into the paper manufacture effluent.

The invention is now illustrated in relation to the following examples, but is not limited to these.

EXAMPLE 1 ACCORDING TO THE INVENTION

In order to prepare the reaction product of epichlorohydrin and trimethylamine, 187.7 kg of 33% strength by weight trimethylamine were run into a steel vessel of 300 l capacity, fitted with a stirrer and temperature point. 97.0 kg of eipchlorohydrin were then added slowly with stirring and cooling, from a supply vessel. The temperature rose to 65° C. The reaction product was kept at this temperature for a further 2 hours, while stirring, and the reaction was then completed by cooling.

284.7 kg of end product ≈ 1,048.5 mols were obtained. The chlorine split off, which is present in the solution as chloride, was 99.5% of theory, relative to epichlorohydrin. The pH was about 11.20.

Separately from this, 79.4 kg. corresponding to 770 mols, of diethylenetriamine, 103.1 kg ≈ 706 mols of adipic acid and 15.98 kg = 140 mols of caprolactam were run, with stirring, into a steel autoclave of 300 l capacity, fitted with a stirrer, a temperature point and a side condenser. The mixture of monomers was then heated to 165° C. as a result of which there was a slight excess pressure. 120 kg of water of condensation were distilled off from the mixture over the course of 2 hours. The reaction temperature was then raised to 185° C and the secondary condensation was continued for a further 2 hours while passing nitrogen through at a rate of 80 l/hour. Altogether, 24.5 kg of water were distilled off. After the polycondensate had been cooled, 123 l of water were added as diluent.

An intermediate analysis gave the following results.
Concentration: 50.05% by weight
pH value: 11
Amine number: 278 mg of KOH/g of polyconsate (PC)
Viscosity at 20° C: 200 cP The whole polycondensate solution was then transferred into a 1,200 l steel vessel fitted with a stirrer and temperature point. The solution of the polyamide was diluted with water to 25% strength by weight and was then heated to 60° C and 41.82 kg = 0.200 mol per 1 mol equivalent of secondary amino groups of the abovementioned reaction product of trimethylamine and epichlorohydrin were then added to the solution of polycondensate. After 1 hour of addition reaction, the incresed solids content was once more adjusted with water to 25% strength by weight.

Finally, the reaction product was crosslinked with 11.967 kg ≈ 0.168 mol per 1 mol equivalent of secondary amine groups, of epichlorohydrin, the epichlorohydrin being added slowly to the solution and the reaction mixture being kept continuously stirred at a speed of 100 revolutions per minute.

After a reaction time of altogether 7.5 hours at a reaction temperature of 60° C, the flow time of the product was measured in accordance with DINA 53,211, with the aid of a Frikmer cup. Under these conditions the flow time was 34 seconds.

The finished product, thus measured and fixed, was then again diluted with water to 20% strength by weight and was cooled.

The final analysis of the product thus obtained gave the following results:
Concentration in the aqueous solution: 20.25% by weight
pH value: 9.0
Amine number: 153 mg of KOH/g of PC
Viscosity: 178 cP
Appearance: faintly yellow solution.

EXAMPLE 2 ACCORDING TO THE INVENTION

The polycondensate was prepared as described in Example 1 and using exactly the same quantities. The solution was also diluted with water to 25% strength by weight and heated to 60° C. 11.967 kg (≈ 0.168 mol/1 mol equivalent of secondary amine group) of epichlorohydrin were then introduced slowly under the stirring conditions described. After a reaction time of 7 ¼ hours at 60° C, it was possible to measure a flow time of 34.5 seconds, which did not change even after a further additional reaction phase.

41.82 kg (≈ 0.200 mol/1 mol equivalent of secondary amine group) of the reaction product according to Example 1 were now introduced into the viscous solution. After an addition reaction time of 1 hour, the Frikmer cup gave a flow time of 32 seconds, which did not alter even during an additional reaction time of 1 hour. The end product was adjusted to 20% strength by weight.

The analysis gave the following results:
Concentration: 20.15% by weight
pH value: 9.10
Amine number: 149 (mg of KOH/g of PC)
Viscosity (20° C): 172 cP
Appearance: clear, slightly yellow solution.

Table 1 which follows lists further examples according to the invention in order to represent the different quantities used of the reaction product of trimethylamine and epichlorohydrin according to Example 1.

The quantities of the polycondensate used corresponded to those according to Example 1.

The modification and crosslinking were carried out as can be seen in Example 1.

taken had a pH value of 6.8 and had become gel-like after 8 days.

Table 1

| Ex. No | Quantity used of reaction product according to Ex. 4a (kg) | Molar ratio of reaction product according to Ex. 4a | / | 1 mol equivalent of secondary amine group | pH value | Final analysis amine number | concentration (% by weight) | Viscosity (cP) (20° C) by Hoppler |
|---|---|---|---|---|---|---|---|---|
| 3 | 125.46 | 0.600 | / | 1 | 8.9 | 140 | 20.1 | 168 |
| 4 | 250.9 | 1.200 | / | 1 | 9.1 | 129 | 20.2 | 181 |
| 5 | 376.4 | 1.800 | / | 1 | 9.2 | 119 | 20.05 | 175 |

COMPARISON EXAMPLE 1 (DAS No. 1,771,814) ≈ REACTION PRODUCT 1 a. 108 g (1.05 mols) of diethylenetriamine, 146 g (1 mol) of adipic acid and 57 g (0.5 mol) of caprolactam, mixed with 7 g (0.04 mol) of adipic acid hydrazide, are introduced into a reaction flask fitted with a stirrer, a thermometer and a side condenser. The mixture of monomers is heated to 150° C over the course of 3 hours while passing $N_2$ through and stirring, approx. 35 g of water being distilled off. After applying a vacuum of approx. 20 mm Hg, the reaction is continued until approx. 50 ml of distillate have been collected. The product is cooled to approx. 120° C and diluted with 270 g of water to 50% strength by weight.

b. 420 g of this 50% strength solution of polycondensate are heated to 85° C with 428 g of water and 16.8 g (≈ 0.21 mol/1 mol equivalent of secondary amine group) of 1,2-dichloroethane in another reaction flask having a reflux condenser, and the mixture is stirred at this temperature until the viscosity of the solution has reached approx. 250 cP at 80° C (measured in a Höppler viscometer), which, in the case of our repetition, was the case only after more than 12 hours. The product was treated as described with 150 g of water and approx. 60 g of concentrated hydrochloric acid and was cooled. The pH value was 3.9 and the concentration was 20.1% by weight. The Höppler viscosity was 240 cP at 25° C. A samples taken before the addition of the hydrochloric acid was completely gelled after 2 hours.

COMPARISON EXAMPLE 2 (U.S. Pat. No. 3,320,215) ≈ EXAMPLE 1

93 g (0.9 mol) of diethylenetriamine, 20 g (0.136 mol) of triethylenetetramine and 50 g of water are run into a round flask having a stirrer, thermometer and condenser. 20 g (0.177 mol) of caprolactam and 145 g (1 mol) of adipic acid are added to this solution. The mixture of monomers is then heated with stirring and the quantity of water which is theoretically liberated is distilled off at 195° C over 3.5 hours. A vacuum is then additionally applied for ½ hour at 180°–190° C, in order to complete the reaction. The product is cooled to approx. 140° C and 385 g of water are added in portions. The diluted solution has a concentration of 36.85% be weight.

91 g of this solution are withdrawn and mixed with 263 g of water and heated to 50° C in a round flask, while stirring. 16.0 g of epichlorohydrin are now added dropwise, the solution of condensate being heated to 65° C.

After a period of approx. 2.5 hours, the Gardner viscosity as given in US-PS Example 1 (≈ approx. 250 cP) had been reached, a sample was withdrawn and the product was diluted with 150 g of water, cooled and adjusted to pH 4 with concentrated hydrochloric acid. The concentration was 10.5% by weight. The sample

COMPARISON EXAMPLE 3 (≈ EXAMPLE 1 of U.S. Pat. No. 3,086,961)

146 g (1 mol) of adipic acid and 103.2 g (1 mol) of diethylenetriamine were mixed in a round flask having a condenser, thermometer and stirrer and were heated to 165° C while passing $N_2$ through and stirring was continued until 35 ml of water had been distilled off, which was the case after 2.5 hours. The solution was then cooled. The polycondensate was diluted with water to 30% strength by weight and was heated to 60° C. 10 mol% of epichlorohydrin (≈ 0.100 mol/1 secondary amine group ≈ 9.25 g of epichlorohydrin) were then added to the polycondensate solution. The viscosity was measured after 2, 4, 6, 8 and 10 hours; as, however, no alteration of the initial viscosity could be obtained in any case, the reaction was discontinued after 10 hours and the product was cooled. The viscosity, measured by Höppler's method, was only 45 cP at 20° C and the concentration was 30.4% by weight.

As can be seen in the preceding comparison example, the similarly prepared polycondensate solution was also diluted to 30% strength by weight with water and heated to 60° C in accordance with Example 3 of the abovementioned US-PS. 20 mol% of epichlorohydrin (≈ 0.200 mol/1 secondary amine group ≈ 18.50 g of epichlorohydrin) were now added to the polyamide solution. After stirring for 2.5 hours, a viscosity of 160 cP (Höppler, 20° C) was measured, ≈ approx. Gardner-Holdt G. The pH value of the product was immediately adjusted to 4 with concentrated hydrochloric acid and it was cooled. A sample withdrawn before the addition of the hydrochloric acid gelled completely after 1 hour.

The end product which had been treated with hydrochloric acid had a concentration of 30.8% by weight and a Gardner-Holdt viscosity between F and G, ≈ 150 cp (20° C) measured in the Höppler viscometer.

COMPARISON EXAMPLE 4 (≈ EXAMPLE 6 of GB-PS No. 1,035,296)

183 g (1.25 mols) of triethylenetetramine and 183 g (1.35 mols) of adipic acid were mixed in a round flask (in accordance with the other examples), were heated to 150° C while stirring and passing $N_2$ through and were allowed to condense for 2 hours.

After cooling, the solution was diluted with water to 35% strength by weight and was once more heated to 80° C. 14 g of epichlorohydrin were then added and the mixture was kept at 80° C for approx. 90 minutes, while stirring. A further, calculated 3.20 g of epichlorohydrin, corresponding to the described ratio of 0.09 mol of epichlorohydrin/secondary amine group, was additionally run into the solution (in accordance with Example 6 of GB-PS No. 1,035,296 and Example 1 of U.S. Pat. No. 3,086,961).

The reaction was continued for a further 2 hours; as, however, no increase in the viscosity could be detected and measured, the product was cooled and adjusted to pH 4 with hydrochloric acid as described.

ity, compared with the products of which the preparation was repeated in the comparison examples.

Table II

| Example No. | Increase in drainage capacity in %, relative to the initial drainage capacity (standard) when adding the products of the invention and the comparison products (solutions) in: | | |
|---|---|---|---|
| | 0.10% strength by weight | 0.20% strength by weight | 0.30% strength by weight |
| 1 (according to the invention) | 76 | 80 | 85 |
| 2 (according to the invention) | 71 | 76 | 79 |
| 3 (according to the invention) | 70 | 75 | 79 |
| 4 (according to the invention) | 74 | 73 | 83 |
| 5 (according to the invention) | 73 | 76 | 82 |
| 1 (comparison example) | 67 | 70 | 73 |
| 2 (comparison example) | 64 | 68 | 71 |
| 3 (Example 1 of US-PS 3,086,961) | 20 | 22 | 25 |
| 3 (Example 3 of US-PS 3,086,961) | 60 | 64 | 67 |
| 4 | 18 | 21 | 22 |

It therefore appeared, that the viscosity before the addition of the quantity of epichlorohydrin and after the phase of the reaction described, had not altered (as indeed would be expected).

Use Example 1

The products mentioned from the example prepared in accordance with the invention and from the comparison examples were tested as follows to assess their drainage capacity. The time of drainage was determined by means of the Schopper-Reigler apparatus in accordance with the pamphlet V/7/61 (Verein der Zellstoff- und Papier-Chamicker und -Ingenieure ("Association of Pulp and Paper Chemists and Engineers")).

Working principle

The bottom outlet socket of the Schopper-Riegler apparatus is closed with a stopper. 3.0 g of dry fibre pulp, uniformly dispersed in a pulp-water volume of 1,000 ml (at 20°), are discharged from the container of the apparatus onto the wire by opening the bottom valve, whereupon the pulp-water mixture drains more or less rapidly.

The water which flows away emerges through the side outlet. The time in seconds, during which the 700 ml of water emerge from the side outlet, is determined, measured from the instant of lifting the bottom valve. The fibre pulp used was newsprint of uniform consistency, comminuted mechanically. Since 0.1 - 0.3% by weight of additives (relative to dry fibres) consisting of retention and drainage auxiliaries is customarily used in the production of paper, these quantities of additives were also used as a basis in this series of tests.

Table II which follows summarises the results of all the products tested.

0.2% strength by weight solutions were made up of the products prepared in accordance with the examples according to the invention and the comparison examples. Before the fibre pulp-water volume was poured into the flow cup, 1 ml ≈ 0.1% strength by weight, 2 ml ≈ 0.2% strength by weight and 3 ml ≈ 0.3% strength by weight of the solutions prepared were appropriately added as drainage auxiliaries.

Table II clearly shows the superiority of the products according to the invention in respect of drainage capac-

Use Example 2

So-called "corrugated material" was prepared on a production paper machine from ground waste paper without additives which influence the pH-value. Operations were carried out in the neutral range with a closed circulation of water. The drainage and retention auxiliary agent used was as known commerical product of the "polyethyleneimine" class, added before the headbox in an amount of 0.3% by weight, relative to dry material, by means of a metering pump installation having a capacity of 100 strokes/minute. The speed of the paper machine was 227 m/minute; the backwater had a temperture of 40° C and a pH value of 6.

With these machine conditions, a change was now made, at the same dosage, from the commerical product to the drainage and retention auxiliary agent prepared, in Example 1 according to the invention. After a production running time of 3 hours, no adverse changes of any kind could be observed in the machine. A sample of the dry corrugated material was taken for ash determination and a sample of the effluent was taken to determine the retention effect.

The remaining products according to the invention from Example 1 - 5 and the products from the Comparison Examples 1 -4 were also tested on this paper machine analogously to this procedure and corresponding samples were taken.

With the products from the Comparison Examples 3 (Example 1) and 4, it was necessary to discontinue their use on the paper machine after quite a short time, because the drainage of the products and the retention became so poor that an interruption of production would have been inevitable.

It was therefore not possible to employ these 2 comparison products for determining the retention effect on the paper machine. As ash determination was carried out on the samples of paper obtained from the products mentioned, which were used in accordance with the invention, and from the remaining comparison products.

At the same time, the samples of effluent (backwater) which were taken in parallel, were examined for solids content (dry residue). Both determinations are a measure of the retention effect. The results are summarised in Table III which follows.

For comparison, the retention and drainage auxiliary agent customarily used in production — Tydex 16 — of Messrs. Dow Chemical (polyethyleneimine) was also examined and is included in Table III.

the known basic polyethyleneimine products which are available commercially.

The acid comparison products the preparation of which was repeated according to the state of the art, were also included in the test.

The following polyethyleneimines (commercial

Table III

| Example No. | | Ash content of the paper, in % by weight | Dry residue in effluent, in g/l |
|---|---|---|---|
| Invention example | 1 | 6.22 | 1.500 |
|  | 2 | 6.20 | 1.520 |
|  | 3 | 6.19 | 1.480 |
|  | 4 | 6.17 | 1.460 |
|  | 5 | 6.18 | 1.500 |
| Comparison example DAS 1,771,814 | 1 | 5.88 | 1.740 |
| Comparison example US-PS 3,320,215 | 2 | 5.80 | 1.810 |
| Comparison example (US-PS 3,086,961 (see Example 3 therein) | 3 | 5.83 | 1.840 |
| Commercial product "Tydex 16" |  | 5.92 | 1.650 |

Use Example 3

It is intended to show in this example that the basic products prepared in accordance with the invention are also stable on storage for a longer period and that their viscosity state does not alter. The flow time was tested in the Frikmer cup already mentioned, at 20° C over the course of 12 weeks, at intervals of 2 weeks. The results are summarised in Table IV.

products) were employed for the mixtures:
Tydex 16: of DOW Chemical
Polymin SN: of BASF.

The polyethyleneimines were mixed with the products listed in Table V in proportions of 75% by weight and 25% by weight. The flow time in a Frikmer cup was then measured again over a period of 12 weeks at intervals of 2 weeks.

As no increase in viscosity was obtained with the products prepared in the Comparison Examples 3 (Example 1) and 4, the latter are not taken into accout in Table V.

Table V

Test of compatibility and stability on storage using commercial products of a basic nature

| Products from invention Example No. | Flow time in the Frikmer cup in seconds at 20° C, measured after: | | | | | | | | | | | |
|---|---|---|---|---|---|---|---|---|---|---|---|---|
|  | 2 | | 4 | | 6 | | 8 | | 10 | | 12 weeks | |
|  | A | B | A | B | A | B | A | B | A | B | A | B |
| 1 | 74.8 | 144.2 | 74.4 | 143.6 | 74.2 | 143.5 | 74.2 | 143.5 | 74.2 | 143.5 | 74.2 | 143.5 |
| 2 | 70.6 | 143.5 | 70.2 | 143.0 | 70.0 | 142.8 | 70.0 | 142.8 | 70.0 | 142.8 | 70.0 | 142.8 |
| 3 | 70.2 | 143.1 | 69.7 | 142.9 | 69.6 | 142.6 | 69.5 | 142.5 | 69.5 | 142.5 | 69.5 | 142.5 |
| 4 | 75.0 | 146.8 | 74.6 | 146.0 | 74.4 | 145.8 | 74.4 | 145.8 | 74.4 | 145.8 | 74.4 | 145.8 |
| 5 | 75.8 | 144.0 | 73.2 | 143.5 | 70.0 | 143.4 | 73.0 | 143.4 | 73.0 | 143.4 | 73.0 | 143.4 |
| Comparison Examples |  |  |  |  |  |  |  |  |  |  |  |  |
| 1 | G | G |  |  |  |  |  |  |  |  |  |  |
| 2 | G | G |  |  |  |  |  |  |  |  |  |  |
| 3 (Example 3 of US-PS 3,086,961) | G | G |  |  |  |  |  |  |  |  |  |  |

Explanation: A ≈ 25% proportion of polyethyleneimine "Tydex 16" in the corresponding product
B ≈ 75% proportion of polyethyleneimine "Tydex 16" in the corresponding product
G ≈ The product mixture gelled.
Analogous results were obtained with the product "Polymin SN".

Table IV

| Product from Example according to the inventin No. | Flow time in seconds (20° C) | | | | | measured after: 12 weeks |
|---|---|---|---|---|---|---|
|  | 2 | 4 | 6 | 8 | 10 |  |
| 1 | 38 | 38 | 38.4 | 38.4 | 38.4 | 38.4 |
| 2 | 37.5 | 37.8 | 37.9 | 37.9 | 37.9 | 37.9 |
| 3 | 34 | 34.2 | 34.2 | 34.2 | 34.2 | 34.2 |
| 4 | 39.2 | 39.5 | 39.5 | 39.5 | 39.5 | 39.5 |
| 5 | 38.2 | 38.2 | 38.4 | 38.4 | 38.4 | 38.4 |

USE EXAMPLE 4

In this example it is intended to demonstrate the perfect compatibility and stability on storage of the products prepared in accordance with the invention, with If, within the scope of the abovementioned process according to the invention, a trialkyleneamine is reacted with one mol equivalent of a polyfunctional compound or one mol equivalent of a polyfunctional compound is reacted and this reaction product is allowed to react with a basic polyaminoamide which, before or after this reaction, has been crosslinked with 0.16 – 0.18 mol of epichlorohydrin per mol of secondary amino group in the polyalkylenepolyamide, a particularly valuable product is obtained, because the abovementioned quantity of crosslinking agent gives products with a particularly good retention effect and particularly good storage stability in a basic medium. This is because, if substatially more than the abovementioned optimum quantity of crosslinking agent is used, the solution viscosity of the product increases spontaneously in its solution after a certain induction period. Even if only a little more than the abovementioned quantity of crosslinking agent is used, the solution viscosity of the product in a basic medium increases further continuously. In both cases, this continuation of reactions which is indicated by a rise in the solution viscosity can only be stopped by the addition of acids, such as, for example, hydrochloric acid, sulphuric acid, acetic acid, formic acid and the like.

If, on the other hand, less than the optimum quantity of crosslinking agent is added, a noticeable increase of the viscosity does not occur nor does the product possess optimum functions for the retention effect. Only when the abovementioned optimum quantity of crosslinking agent is added, is a solution viscosity achieved, after 2 to 10 hours, which no longer alters, so that the aqueous solution of the product remains stable on storage in an alkaline medium.

It has subsequently been established that the substantially optimum retention effect of the product can probably be traced back to the process step, according to the invention, of reacting epichlorohydrin with trimethylamine or with another trialkylamine, with a subsequent addition reaction with the crosslinked or uncrosslinked, basic polyaminoamide, because the product obtained in this way has a positive charge, which can, accordingly, be used advantageously, probably owing to the negative Zeta potential of the fibres and pigments which are supposed to be retained in the pulp of fibre material and paper.

The synthesis of the water-soluble, basic polyaminoamides which are polycondensed from polyalkylenepolyamines, dicarboxylic acids and diamines, is not a subject of this invention; it is described in detail in German Offenlegungsschrift No. 2,209,242 equivalent to U.S. Pat. No. 3,945,983.

I claim:

1. A process for the production of a modified basic polyaminoamide resin which comprises the sequential steps of:
    a. reacting substantially equimolar portions of a polyfunctional compound selected from the group consisting of epichlorhydrin, dichlorhydrin, or mixtures thereof, with a tertiary amine selected from the group consisting of trimethylamine, triethylamine, tripropylamine, tributylamine, dimethylaniline, dimethylcyclohexylamine, or mixtures of any of said amines, to form an ammonium compound;
    b. reacting 0.2 - 1.8 mols of said ammonium compound with each mol of secondary amine group in a water-soluble, basic polyaminoamide which is a condensation product of
        1. a dicarboxylic acid,
        2. a polyalkylenepolyamine, and
        3. an aminocarboxylic acid or a lactam; and
    c. reacting the product of step (b) with 0.15 - 0.19 mol of said polyfunctional compound per mol equivalent of secondary amino group in said polyaminoamide.

2. A procces according to claim 1, wherein 0.16 to 0.18 mol of said polyfunctional compound per mol equivalent of secondary amino group of said polyaminoamide is reacted.

3. A process for the production of a modified basic polyaminoamide resin which comprises the sequential steps of:
    a. reacting substantially equimolar portions of a polyfunctional compound selected from the group consisting of epichlorhydrin, dichlorhydrin, or mixtures thereof, with a tertiary amine slected from the group consisting of trimethylamine, triethylamine, tripropylamine, tributylamine, dimethylaniline, dimethylcyclohexylamine, or mixtures of any of said amines, to form an ammonium compound;
    b. reacting a water-soluble, basic polyaminoamide which is a condensation product of
        1. a dicarboxylic acid,
        2. a polyalkylenepolyamine, and
        3. an aminocarboxylic acid or a lactam
        with 0.15 - 0.19 mol of said polyfunctional compound per mol equivalent of secondary amino group in said polyaminoamide; and
    c. reacting the product of step (a) with the product of step (b) in the proportion of 0.2 - 1.8 mols of said ammonium compound per mol of secondary amino group in said basic polyaminoamide.

4. The process of claim 3 wherein 0.16 to 0.18 mol of said polyfunctional compound per mol equivalent of secondary amino group of said polyaminoamide is reacted.